United States Patent
Wilson

[11] Patent Number: 5,420,486
[45] Date of Patent: May 30, 1995

[54] MULTIPLE MOTORS CONTROLLERS

[76] Inventor: John T. R. Wilson, 736 Lynnhaven La., La Canada Flintridge, Calif. 91011-2416

[21] Appl. No.: 207,545

[22] Filed: Mar. 7, 1994

Related U.S. Application Data

[63] Continuation-in-part of Ser. No. 746,602, Aug. 19, 1991, Pat. No. 5,293,518, which is a continuation-in-part of Ser. No. 804,588, Mar. 20, 1986, Pat. No. 5,077,509, which is a continuation-in-part of Ser. No. 188,000, Sep. 17, 1980, abandoned.

[51] Int. Cl.$^6$ ............................................. H02P 7/68
[52] U.S. Cl. .................................. 318/439; 318/292; 318/245; 318/45; 318/49
[58] Field of Search ................................. 318/8-15, 318/34, 40-51, 53, 66, 67, 68, 79-84, 439, 244-246, 288, 290-293, 538, 539

[56] References Cited

U.S. PATENT DOCUMENTS 1,313,079  8/1919  Emmet .
3,268,785  8/1966  Gerber et al. .
3,697,763 10/1972  Middlebrook .
4,087,731  5/1978  Rhoades .

Primary Examiner—Bentsu Ro
Attorney, Agent, or Firm—Nilsson, Wurst & Green

[57] ABSTRACT

This invention is for incrementally controlling energizing and de-energizing of at least two electrical motors in which motor armatures are mechanically coupled to a single mechanical member and in which motor stators are mechanically referenced to a second mechanical member. By energizing and deenergizing two or more electric motors of different force and torque capability coupled in this manner it is possible to provide increments of force and torque as small as the incremental capability of the smallest motor and to provide a large number of force and torque increments which can approximate a smooth control of force and torque in forward and reverse directions. The type of motor used for this invention is a multiple-two-node-open-circuit-armature-winding motor as disclosed in the referenced patents. This type of motor offers various levels of energizing the motor to the full force and torque capability.

19 Claims, 1 Drawing Sheet

MULTIPLE MOTORS CONTROLLERS

This application for patent is a continuation-in-part of Ser. No. 07/746,602 filed Aug. 19, 1991, now U.S. Pat. No. 5,293,518, which is a continuation-in-part of Ser. No. 06/804,588 filed Mar. 20, 1986, now U.S. Pat. No. 5,077,509, which is a continuation-in-part of Ser. No. 188,000 filed Sep. 17, 1980, now abandoned.

SUMMARY OF THE INVENTION

This invention is of controllers for several multiple open-circuit-armature windings electrical motors and two-node, open-circuit-armature-windings electrical motors as are described in U.S. Pat. No. 4,305,027 and U.S. Pat. Re. No. 32,674 which is the reissue of U.S. Pat. No. 4,305,027; these patents are incorporated herein by this reference. A prior U.S. Pat. No. 5,077,509 titled Multiple Windings Electrical Motors Controllers is incorporated herein by this reference.

The present invention provides for multiple increments in control of force and torque generated between an armature-commmon mechanical member, mechanically coupled to respective armatures of separate, multiple windings electrical motors, and a stator-common mechanical member, mechanically coupled to respective stators of the separate, multiple windings electrical motors; the multiple increments can be a large number of small increments by having the separate, multiple windings electrical motors with different force-and-torque-generating capability. By sequencing switches which energize and de-energize various such respective motors, or potions of such respective motors, increases and decreases of force or torque between the armature-common member and the stator-common member can be achieved to the various additive levels of force or torque available from combining multiples of such motors. As described and claimed in the reference patent, the various levels of force or torque in a respective multiple two-node windings electrical motor are obtained by operating electrical switches which energize various numbers of force or torque generating winding sets within the motor and by positioning a brush holder in the motor. The means of energizing and de-energizing these winding sets are individual electrical switches, which can be sequentially operated by means disclosed in reference U.S. Pat. No. 5,077,509. The multiple windings electrical motor is uniquely controllable; the multiple windings electrical motor has multiple brushes in two groups contacting the commutator which provide multiple electrical control points. Each of these brushes can be energized, either directly or in series with a stator winding or portion thereof, through an electrical switch with electrical energy derived from an electrical energy source. Thus, by operating respective electrical switches for respective motors, the magnitude of force or torque generated by respective, multiple-two-node-windings-electrical motors can be controlled. Another aspect of the multiple-two-node-windings-electrical-motor control is use of the position of the brush holder to control the positions of the groups of brushes and thereby control the direction and magnitude of force or torque generation. This invention includes the sequential operation of individual electrical switches to proceed in increments to any desired force or torque generation within the capabilities of at-least-two such motors.

BACKGROUND OF THE INVENTION

1. Field of the Invention

This invention is related to motor speed and torque controllers for both positive and negative torques, and to motor starters, and power output controllers. This invention is related to such controllers for brush-type and brushless machines, and more particularly, to controllers for brush-type and brushless electrical machines of the types disclosed in the referenced patents. This invention is related to controllers of conventional, brush-type and brushless motors in groups of two or more.

2. Background Art

Previous brush-type electrical machine controllers have used series resistance to control speed and torque and current, especially the excessive currents caused during the starting of series motors. The control of these brush-type machines is very important in considering the application of these motors. There has been a lack of a reliably-operating, efficient controller for brush-type machines. The speed and torque of a series motor energized from a constant potential supply can be controlled by inserting resistance in series with the supply line. Speed control for shunt and compound motors can be obtained by inserting resistance in series with the armature circuit only. The stator field flux of shunt motors can be varied to control the speed of these motors, although special care is required to prevent overspeeding of the motor if the shunt stator field flux becomes very weak. The speed of DC motors can be varied by varying the voltage applied to the motors; the Ward Leonard system of speed control is an example of varying the voltage applied to the DC motor. In the Ward Leonard system the adjustable output voltage from a motor-generator set is applied to the motor. Electric vehicle motor controllers use semiconductor chopper controllers as well as electromechanical switches to connect resistors and batteries in various combinations to regulate electrical power input to the motor, which thereby control the motor output torque. Alternating current induction motors are being controlled for powering other electric vehicles.

DISCLOSURE OF THE INVENTION

This invention is for controlling the energizing and de-energizing of two or more electrical motors which are mechanically coupled to the same output member and which are mechanically referenced to another member. By energizing and de-energizing two, multiple two-node windings electric motors of different force and torque capability coupled in this manner, it is possible to provide increments of force and torque as small as the incremental capability of the smallest motor and to provide a large number of force and torque increments. One objective of this invention is to smooth changes between torque levels of the larger motor and to add the torque capability of the smaller motor to that of the larger motor.

The type of motor used for this invention is a multiple-two-node-open-circuit-armature-winding motor as disclosed in the referenced patents. This type of motor has various levels of energizing the motor to the full force and torque capability of the motor. The controller of this invention uses at least two such motors.

This invention uses at least two, multiple-two-node-open-circuit-armature-windings electrical motors of different force and torque capability. In each of these motors, various conditions of control are used according to the number of force and torque levels available in each motor. The smaller motor introduces smaller torque increments or steps which provides smoother force or torque control. This invention allows smoother control by having two sizes of motors.

BRIEF DESCRIPTION OF THE DRAWINGS

In FIG. 1 dotted lines are used to represent stator or armature windings as the windings pass behind stator or armature magnetic members respectively.

DETAILED DESCRIPTION OF THE INVENTION

Figure 1:
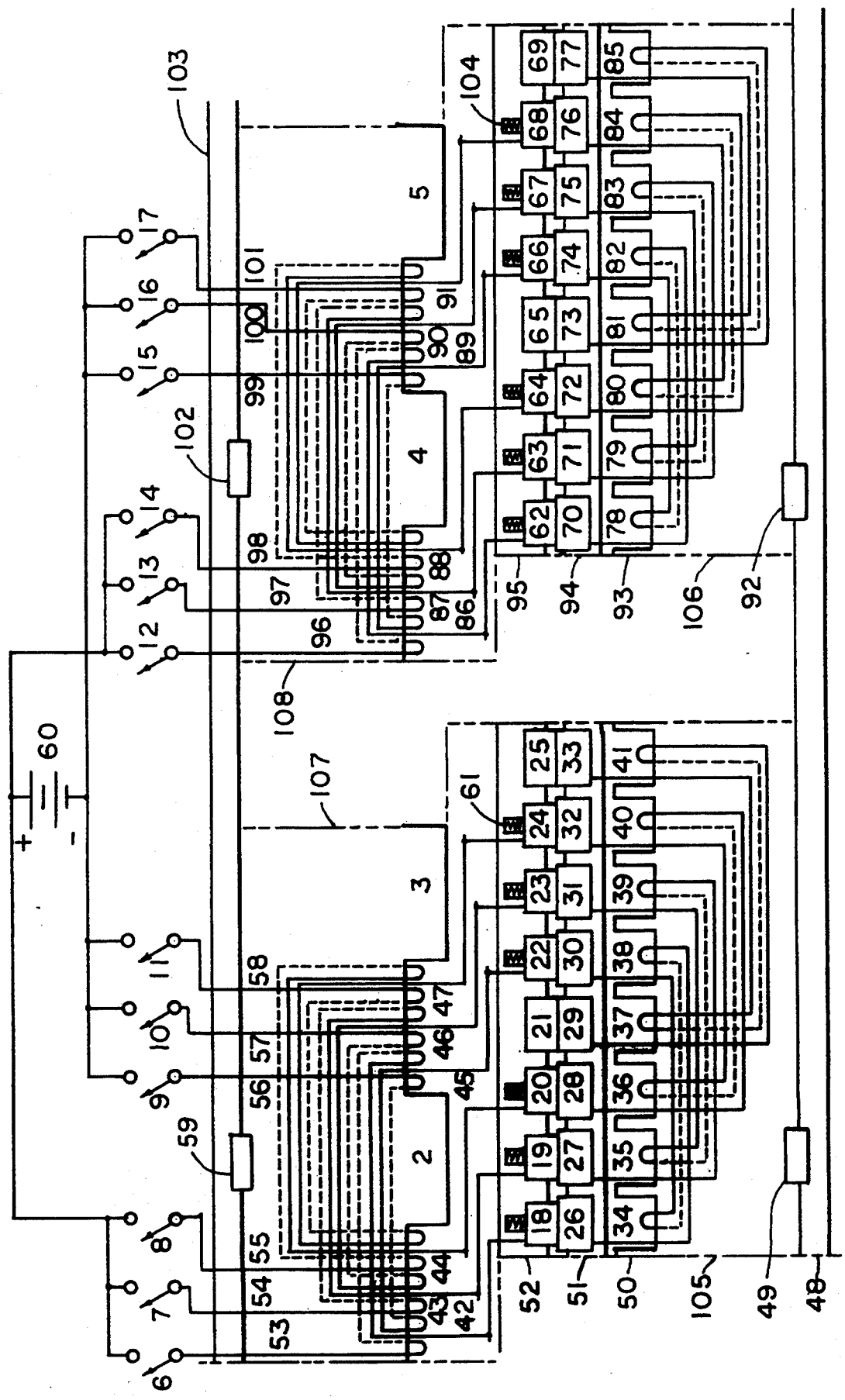
FIG. 1 shows a linear representation of a controller for two, two-pole, multiple-two-node-armature-windings electrical motors in which each such electrical motor has three force or torque generating winding sets and the force or torque may be varied between zero and maximum in fifteen discrete steps by operating six, two-pole, single throw switches. The multiple, two-node-armature-windings electrical motor linear representation uses the same drawing simplifications used in the reference patents and adds a brush holder. To simplify FIG. 1 and represent two, multiple-two-node-armature-windings motors in one view, the commutators 51 and 94, with respective commutator segments 26 through 33 and 70 through 77, and respective brushes 18 through 25 and 62 through 69, and connecting circuits and respective brush holders 52 and 95 and respective brush springs, ones designated 61 and 104, are shown in enlarged air gaps between the stator magnetic poles 2 and 3 and the magnetic armature 105 and the stator magnetic poles 4 and 5 and the magnetic armature 106. The preferred and practical electrical machines constructions in accord with the reference patents and parent application and the present application is to remove these elements from these fictitious but simplifying air gaps placements and place them adjacent to stator magnetic yokes 107 and 108 and armature magnetic members 105 and 106, respectively. Several figures showing the practical placement of a commutator and brush holder with brushes in a rotary multiple windings electrical machine and in a rotary, multiple, two-node windings electrical motor are shown in the reference U.S. Pat. No. 4,305,027.

Consider two, two-pole multiple windings electrical motors as represented in linear fashion in FIG. 1. If it is assumed that the smaller motor is controlled by switches 6 through 11 and the larger motor is controlled by switches 12 through 17, and that the force and torque generated by energizing one winding set of the larger motor is one and one third times the total force and torque capability of the smaller motor, then, the force and torque delivered to the armature-common mechanical member 48, assuming stator-common mechanical member 103 as the reference, can be varied in force and torque increments of approximately one-third of the smaller-motor-maximum force and torque capability by energizing or de-energizing the split-stator windings of both motors in a fifteen-step sequence. Thus, if the smaller motor has a total capability of one foot-pound of torque and the larger motor has a total capability of four foot-pounds of torque, the combined torque from both motors will be five foot-pounds of torque and the torque will be controllable in fifteen increments of one-third foot-pound each. The fifteen step sequence is as follows.

In FIG. 1, the first step of this sequence is to energize in stator 107 the stator winding 53-42 and stator winding 56-45 from unidirectional voltage source 60 by closing electrical switches 6 and 9. The stator windings 53-42 and 56-45 connect to first and second brushes group brushes 18 and 22 respectively, which connect through various segments of the commutator 5 at various armature positions to energize open circuit armature windings once removed contrary to the direction of force and torque generation from the brush vacancies 21 and 25, and from which the armature 105 and open circuit armature windings will move in the forward direction of force and torque generation—armature 105 and armature-common member 48 movement to the left in FIG. 1.

In FIG. 1, the second step of this sequence is to continue the first step and additionally energize in stator 107 the stator winding 54-43 and stator winding 57-46 from unidirectional voltage source 60 by closing electrical switches 7 and 10. The stator windings 54-43 and 57-46 connect to first and second brushes group brushes 19 and 23 respectively, which connect through various segments of the commutator 51 at various armature positions to energize open circuit armature windings twice removed contrary to the direction of force and torque generation from the brush vacancies 21 and 25, and from which the armature 105 and open circuit armature windings will move in the forward direction of force and torque generation—armature 105 and armature-common member 48 movement to the left in FIG. 1.

In FIG. 1, the third step of this sequence is to continue the second step and additionally energize in stator 107 the stator winding 55-44 and stator winding 58-47 from unidirectional voltage source 60 by closing electrical switches 8 and 11. The stator windings 55-44 and 58-47 connect to first and second brushes group brushes 20 and 24 respectively, which connect through various segments of the commutator 51 at various armature positions to energize open circuit armature windings thrice removed contrary to the direction of force and torque generation from the brush vacancies 21 and 25, and from which the armature and open circuit armature windings will move in the forward direction of force and torque generation—armature 105 and armature-common member 48 movement to the left in FIG. 1.

In FIG. 1, the fourth step of this sequence is to simultaneously de-energize all the stator windings of stator 107 by opening switches 6 through 11, and to energize, in stator 108, stator windings 96-86 and 99-89 from the unidirectional voltage source 60 by closing electrical switches 12 and 15. The stator windings 96-86 and 99-89 connect to first and second brushes group brushes 62 and 66 respectively, which connect through various segments of the commutator 94 at various armature positions to energize open circuit armature windings once removed contrary to the direction of force and torque generation from the brush vacancies 65 and 69, and from which the armature 106 and open circuit armature windings will move in the forward direction of force and torque generation—armature 106 and armature-common member 48 movement to the left in FIG. 1.

In FIG. 1, the fifth step of this sequence is to continue with switches 12 and 15 closed to generate the armature 106 force and torque contribution, and additionally energize, in stator 107, stator windings 53-42 and 56-45 from the unidirectional voltage source 60 by closing electrical switches 6 and 9. The stator windings 53-42 and 56-45 connect to first and second brushes group brushes 18 and 22 respectively, which connect through various segments of the commutator 51 at various armature positions to energize open circuit armature windings once removed contrary to the direction of force and torque generation from the brush vacancies 21 and 25, and from which the armature 105 and open circuit armature windings will move in the forward direction of force and torque generation—armature 105 and armature-common member 48 movement to the left in FIG. 1.

In FIG. 1, the sixth step of this sequence is to continue the fifth step and additionally energize, in stator 107, stator windings 54-43 and 57-46 from the unidirectional voltage source 60 by closing electrical switches 7 and 10. The stator windings 54-43 and 57-46 connect to first and second brushes group brushes 19 and 23 respectively, which connect through various segments of the commutator 51 at various armature positions to energize open circuit armature windings twice removed contrary to the direction of force and torque generation from the brush vacancies 21 and 25, and from which the armature 105 and open circuit armature windings will move in the forward direction of force and torque generation—armature 105 and armature-common member 48 movement to the left in FIG. 1.

In FIG. 1, the seventh step of this sequence is to continue the sixth step and additionally energize, in stator 107, stator windings 55-44 and 58-47 from the unidirectional voltage source 60 by closing electrical switches 8 and 11. The stator windings 55-44 and 58-47 connect to first and second brushes group brushes 20 and 24 respectively, which connect through various segments of the commutator 51 at various armature positions to energize open circuit armature windings thrice removed contrary to the direction of force and torque generation from the brush vacancies 21 and 25, and from which the armature 105 and open circuit armature windings will move in the forward direction of force and torque generation—armature 105 and armature-common member 48 movement to the left in FIG. 1.

In FIG. 1, the eighth step of this sequence is to simultaneously de-energize all the stator windings of stator 107 by opening switches 6 through 11, and to additionally energize, in stator 108, stator windings 97-87 and 100-90 from the unidirectional voltage source 60 by closing electrical switches 13 and 16; the switches 12 and 15 remaining closed. The stator windings 97-87 and 100-90 connect to first and second brushes group brushes 63 and 67 respectively, which connect through various segments of the commutator 94 at various armature positions to energize open circuit armature windings twice removed contrary to the direction of force and torque generation from the brush vacancies 65 and 69, and from which the armature 106 and open circuit armature windings will move in the forward direction of force and torque generation—armature 106 and armature-common member 48 movement to the left in FIG. 1.

In FIG. 1, the ninth step of this sequence is to continue with switches 12, 15, 13 and 16 closed to generate the armature 106 force and torque contribution and to additionally energize, in stator 107, stator windings 53-42 and 56-45 from the unidirectional voltage source 60 by closing electrical switches 6 and 9. The stator windings 53-42 and 56-45 connect to first and second brushes group brushes 18 and 22 respectively, which connect through various segments of the commutator 51 at various armature positions to energize open circuit armature windings once removed contrary to the direction of force and torque generation from the brush vacancies 21 and 25, and from which the armature 105 and open circuit armature windings will move in the forward direction of force and torque generation—armature 105 and armature-common member 48 movement to the left in FIG. 1.

In FIG. 1, the tenth step of this sequence is to continue the ninth step and to additionally energize, in stator 107, stator windings 54-43 and 57-46 from the unidirectional voltage source 60 by closing electrical switches 7 and 10. The stator windings 54-43 and 57-46 connect to first and second brushes group brushes 19 and 23 respectively, which connect through various segments of the commutator 51 at various armature positions to energize open circuit armature windings twice removed contrary to the direction of force and torque generation from the brush vacancies 21 and 25, and from which the armature 105 and open circuit armature windings will move in the forward direction of force and torque generation—armature 105 and armature-common member 48 movement to the left in FIG; 1.

In FIG. 1, the eleventh step of this sequence is to continue the tenth step and to additionally energize, in stator 107, stator windings 55-44 and 58-47 from the unidirectional voltage source 60 by closing electrical switches 8 and 11. The stator windings 55-44 and 58-47 connect to first and second brushes group brushes 20 and 24 respectively, which connect through various segments of the commutator 51 at various armature positions to energize open circuit armature windings thrice removed contrary to the direction of force and torque generation from the brush vacancies 21 and 25, and from which the armature 105 and open circuit armature windings will move in the forward direction of force and torque generation—armature 105 and armature-common member 48 movement to the left in FIG. 1.

In FIG. 1, the twelfth step of this sequence is to simultaneously de-energize all the stator windings of stator 107 by opening electrical switches 6 through 11, and to additionally energize, in stator 108, stator windings 98-88 and 101-91 from the unidirectional voltage source 60 by closing electrical switches 14 and 17; the electrical switches 12, 15, 13 and 16 remaining closed. The stator windings 98-88 and 101-91 connect to first and second brushes group brushes 64 and 68 respectively, which connect through various segments of the commutator 94 at various armature positions to energize open circuit armature windings thrice removed contrary to the direction of force and torque generation from the brush vacancies 65 and 69, and from which the armature 106 and open circuit armature windings will move in the forward direction of force and torque generation—armature 106 and armature-common member 48 movement to the left in FIG. 1.

In FIG. 1, the thirteenth step of this sequence is to continue with electrical switches 12 through 17 closed to generate the armature-106 force and torque contribution, and to additionally energize, in stator 107, stator windings 53-42 and 56-45 from the unidirectional voltage source 60 by closing electrical switches 6 and 9. The stator windings 53-42 and 56-45 connect to first and second brushes group brushes 18 and 22 respectively, which connect through various segments of the commutator 51 at various armature positions to energize open circuit armature windings once removed contrary to the direction of force and torque generation from the brush vacancies 21 and 25, and from which the armature 105 and open circuit armature windings will move in the forward direction of force and torque generation—armature 105 and armature-common member 48 movement to the left in FIG. 1.

In FIG. 1, the fourteenth step of this sequence is to continue the thirteenth step and to additionally energize, in stator 107, stator windings 54-43 and 57-46 from the unidirectional voltage source 60 by closing electrical switches 7 and 10. The stator windings 54-43 and 57-46 connect to first and second brushes group brushes 19 and 23 respectively, which connect through various segments of the commutator 51 at various armature positions to energize open circuit armature windings twice removed contrary to the direction of force and torque generation from the brush vacancies 21 and 25, and from which the armature 105 and open circuit armature windings will move in the forward direction of force and torque generation—armature 105 and armature-common member 48 movement to the left in FIG. 1.

In FIG. 1, the fifteenth step of this sequence is to continue the fourteenth step and to additionally energize, in stator 107, stator windings 55-44 and 58-47 from the unidirectional voltage source 60 by closing electrical switches 8 and 11. The stator windings 55-44 and 58-47 connect to first and second brushes group brushes 20 and 24 respectively, which connect through various segments of the commutator 51 at various armature positions to energize open circuit armature windings thrice removed contrary to the direction of force and torque generation from the brush vacancies 21 and 25, and from which the armature 105 and open circuit armature windings will move in the forward direction of force and torque generation—armature 105 and armature-common member 48 movement to the left in FIG. 1.

I claim as my invention:

1. A multiple motors controller for controlling electric motors coupled to the same output member and comprising:

multiple electric motors means;

the multiple electric motors means comprises a first motor and a second motor;

the first motor including a first stator and a first armature and the first stator including stator magnetic poles and the first armature including multiple, first, two-node, open-circuit armature windings inductively linking the first armature and insulated from the first armature and from each other;

the second motor including a second stator and a second armature and the second stator including stator magnetic poles and the second armature including multiple, second, two-node, open-circuit armature windings inductively linking the second armature and insulated from the second armature and from each other;

the first motor having at least one, first-motor, repeatable section, wherein a repeatable section includes a group of poles and windings;

the second motor having at least one, second-motor, repeatable section, wherein a repeatable section includes a group of poles and windings;

the first stator having two, first stator magnetic poles per first-motor, repeatable section;

the second stator having two, second stator magnetic poles per second-motor, repeatable section;

an armature-common mechanical member mechanically coupled to the first armature and mechanically coupled to the second armature;

a stator-common mechanical member mechanically coupled to the first stator and mechanically coupled to the second stator;

a first magnetomotive force means energizing the first stator magnetic poles as a north pole and a south pole per first-motor: repeatable section, and with adjacent poles being of opposite polarity;

a second magnetomotive force means energizing the second stator magnetic poles as a north pole and a south pole per second-motor, repeatable section, and with adjacent poles being of opposite polarity;

a first means to control electrical currents in from none to at least one, first, two-node, open-circuit armature winding thereby forming first armature electromagnetic poles of various numbers to first motor strength levels available, with adjacent first armature electromagnetic poles having opposite polarity, and with no more than two, first armature electromagnetic poles per first-motor, repeatable section;

a second means to control electrical currents in from none to at least one, second, two-node, open- circuit armature winding thereby forming second armature electromagnetic poles of various numbers to second motor strength levels available, with adjacent second armature electromagnetic poles having opposite polarity, and with no more than two, second armature electromagnetic poles per second-motor, repeatable section; and means to cooperatively control the first means to control electrical currents and the second means to control electrical currents, to control the force and torque generated by the first motor and the second motor at the armature-common mechanical member with respect to the stator-common mechanical member.

2. A controller according to claim 1 wherein:

the first magnetomotive force means comprises at least one, first stator winding inductively linking at least one, first stator magnetic pole per first-motor, repeatable section;

the second magnetomotive force means comprises at least one, second stator winding inductively linking at least one, second stator magnetic pole per second-motor, repeatable section;

the first means to control electrical currents includes means to control electrical currents in from none to at least one, first stator winding; and the second means to control electrical currents includes means to control electrical currents in from none to at least one, second stator winding.

3. A controller according to claims 1 or 2, further comprising:

the first stator magnetic poles per repeatable section being separated by separations designated within each repeatable section as first-stator, first separation and first-stator, second separation, and said separations being placed alternately first and second in the direction of relative movement between the first stator and the first armature;

the second stator magnetic poles per repeatable section being separated by separations designated within each repeatable section as second-stator, first separation and second-stator, second separation, and said separations being placed alternately first and second in the direction of relative movement between the second stator and the second armature;

a first means to orient the first armature electromagnetic poles with respect to the first stator magnetic poles by as much as one first stator magnetic pole pitch to control the direction and magnitude of the force and torque generated by the first motor as follows:

the direction of the force and torque generated by the first motor being forward when a north-polarity, first armature electromagnetic pole adjacent to the first-stator, first separation moves to approach a south-polarity, first stator magnetic pole;

the direction of the force and torque generated by the first motor being reverse when a north-polarity, first armature electromagnetic pole adjacent to the first-stator, second separation moves to approach a south-polarity, first stator magnetic pole; and the magnitude of the force and torque generated by the first motor being controlled between a maximum obtained when the first armature electromagnetic poles are equidistant between the first stator magnetic poles and a minimum obtained when the first armature electromagnetic poles are closest to the first stator magnetic poles;

a second means to orient the second armature electromagnetic poles with respect to the second stator magnetic poles by as much as one second stator magnetic pole pitch to control the direction and magnitude of the force and torque generated by the second motor as follows:

the direction of the force and torque generated by the second motor being forward when a north-polarity, second armature electromagnetic pole adjacent to the second-stator, first separation moves to approach a south-polarity, second stator magnetic pole;

the direction of the force and torque generated by the second motor being reverse when a north-polarity, second armature electromagnetic pole adjacent to the second-stator, second separation moves to approach a south-polarity, second stator magnetic pole; and the magnitude of the force and torque generated by the second motor being controlled between a maximum obtained when the second armature electromagnetic poles are equidistant between the second stator magnetic poles and a minimum obtained when the second armature electromagnetic poles are closest to the second stator magnetic poles; and the means to cooperatively control includes means to control the first means to orient and the second means to orient, to control the magnitude and direction of the force and torque generated by the first motor and the magnitude and direction of the force and torque generated by the second motor, at the armature-common mechanical member with respect to the stator-common mechanical member.

4. A controller according to claim 1 wherein the multiple electric motors means includes a third motor;

the third motor including a third stator and a third armature and the third stator including third stator magnetic poles and the third armature including multiple, third, two-node, open-circuit armature windings inductively linking the third armature and insulated from the third armature and from each other;

the third stator mechanically coupled to the stator-common mechanical member;

the third armature mechanically coupled to the armature-common mechanical member;

the third motor having at least one, third-motor, repeatable section, wherein a repeatable section includes a group of poles and windings;

the third stator having two, third stator magnetic poles per third-motor, repeatable section;

a third magnetomotive force means energizing the third stator magnetic poles as a north pole and a south pole per third-motor, repeatable section, and with adjacent poles being of opposite polarity;

a third means to control electrical currents in from none to at least one, third, two-node, open-circuit armature winding thereby forming third armature electromagnetic poles of various numbers to third motor strength levels available, with adjacent third armature electromagnetic poles having opposite polarity, and with no more than two, third armature electromagnetic poles per third-motor, repeatable section; and the means to cooperatively control includes means to cooperatively control:

the first means to control electrical currents;

the second means to control electrical currents; and the third means to control electrical currents; to control the force and torque generated by the first motor and the second motor and the third motor at the armature-common mechanical member with respect to the stator-common mechanical member.

5. A controller as in claim 4 further comprising:

the first magnetomotive force means comprises at least one, first stator winding inductively linking at least one, first stator magnetic pole per first-motor, repeatable section;

the second magnetomotive force means comprises at least one, second stator winding inductively linking at least one, second stator magnetic pole per second-motor, repeatable section;

the third magnetomotive force means comprises at least one, third stator winding inductively linking at least one, third stator magnetic pole per third-motor, repeatable section;

the first means to control electrical currents includes means to control electrical currents in from none to at least one, first stator winding;

the second means to control electrical currents includes means to control electrical currents in from none to at least one, second stator winding; and the third means to control electrical currents includes means to control electrical currents in from none to at least one, third stator winding.

6. A controller according to claims 4 or 5, further comprising:

the first stator magnetic poles per repeatable section being separated by separations designated within each repeatable section as first-stator, first separation and first-stator, second separation, and said separations being placed alternately first and second in the direction of relative movement between the first stator and the first armature;

the second stator magnetic poles per repeatable section being separated by separations designated within each repeatable section as second-stator, first separation and second-stator, second separation, and said separations being placed alternately first and second in the direction of relative movement between the second stator and the second armature;

the third stator magnetic poles per repeatable section being separated by separations designated within each repeatable section as third-stator, first separation and third-stator, second separation, and said separations being placed alternately first and second in the direction of relative movement between the third stator and the third armature;

a first means to orient the first armature electromagnetic poles with respect to the first stator magnetic poles by as much as one first stator magnetic pole pitch to control the direction and magnitude of the force and torque generated by the first motor as follows:

the direction of the force and torque generated by the first motor being forward when a north-polarity, first armature electromagnetic pole adjacent to the first-stator, first separation moves to approach a south-polarity, first stator magnetic pole;

the direction of the force and torque generated by the first motor being reverse when a north-polarity, first armature electromagnetic pole adjacent to the first-stator, second separation moves to approach a south-polarity, first stator magnetic pole; and the magnitude of the force and torque generated by the first motor being controlled between a maximum obtained when the first armature electromagnetic poles are equidistant between the first stator magnetic poles and a minimum obtained when the first armature electromagnetic poles are closest to the first stator magnetic poles;

a second means to orient the second armature electromagnetic poles with respect to the second stator magnetic poles by as much as one second stator magnetic pole pitch to control the direction and magnitude of the force and torque generated by the second motor as follows:

the direction of the force and torque generated by the second motor being forward when a north-polarity, second armature electromagnetic pole adjacent to the second-stator, first separation moves to approach a south-polarity, second stator magnetic pole;

the direction of the force and torque generated by the second motor being reverse when a north-polarity, second armature electromagnetic pole adjacent to the second-stator, second separation moves to approach a south-polarity, second stator magnetic pole; and the magnitude of the force and torque generated by the second motor being controlled between a maximum obtained when the second armature electromagnetic poles are equidistant between the second stator magnetic poles and a minimum obtained when the second armature electromagnetic poles are closest to the second stator magnetic poles;

a third means to orient the third armature electromagnetic poles with respect to the third stator magnetic poles by as much as one third stator magnetic pole pitch to control the direction and magnitude of the force and torque generated by the third motor as follows:

the direction being forward when a north-polarity, third armature electromagnetic pole adjacent to the third-stator, first separation moves to approach a south-polarity, third stator magnetic pole;

the direction being reverse when a north-polarity, third armature electromagnetic pole adjacent to the third-stator, second separation moves to approach a south-polarity, third stator magnetic pole; and the magnitude of the force and torque generated by the third motor being controlled between a maximum obtained when the third armature electromagnetic poles are equidistant between the third stator magnetic poles and a minimum obtained when the third armature electromagnetic poles are closest to the third stator magnetic poles; and the means to cooperatively control includes means to control the first means to orient and the second means to orient and the third means to orient, to control the magnitude and direction of the force and torque generated by the first motor and the magnitude and direction of the force and torque generated by the second motor and the magnitude and direction of the force and torque generated by the third motor, at the armature-common mechanical member with respect to the stator-common mechanical member.

7. A controller according to claim 4 wherein the multiple electric motors means includes a fourth motor;

the fourth motor including a fourth stator and a fourth armature and the fourth stator including stator magnetic poles and the fourth armature including multiple, fourth, two-node, open-circuit armature windings inductively linking the fourth armature and insulated from the fourth armature and from each other;

the fourth stator mechanically coupled to the stator-common mechanical member;

the fourth armature mechanically coupled to the armature-common mechanical member;

the fourth motor having at least one, fourth-motor, repeatable section, wherein a repeatable section includes a group of poles and windings;

the fourth stator having two, fourth stator magnetic poles per fourth-motor, repeatable section;

a fourth magnetomotive force means energizing the fourth stator magnetic poles as a north pole and a south pole per fourth-motor, repeatable section, and with adjacent poles being of opposite polarity;

a fourth means to control electrical currents in from none to at least one, fourth, two-node, open-circuit armature winding thereby forming fourth armature electromagnetic poles of various numbers to fourth motor strength levels available, with adjacent fourth armature electromagnetic poles having opposite polarity, and with no more than two, fourth armature electromagnetic poles per fourth-motor, repeatable section; and the means to cooperatively control includes means to cooperatively control:

the first means to control electrical currents;
the second means to control electrical currents;
the third means to control electrical currents; and
the fourth means to control electrical currents; to control the force and torque generated by the first motor and the second motor and the third motor and the fourth motor at the armature-common mechanical member with respect to the stator-common mechanical member.

8. A controller as in claim 7 further comprising:

the first magnetomotive force means comprises at least one, first stator winding inductively linking at least one, first stator magnetic pole per first-motor, repeatable section;

the second magnetomotive force means comprises at least one, second stator winding inductively linking at least one, second stator magnetic pole per second-motor, repeatable section;

the third magnetomotive force means comprises at least one, third stator winding inductively linking at least one, third stator magnetic pole per third-motor, repeatable section;

the fourth magnetomotive force means comprises at least one, fourth stator winding inductively linking at least one, fourth stator magnetic pole per fourth-motor, repeatable section;

the first means to control electrical currents includes means to control electrical currents in from none to at least one, first stator winding;

the second means to control electrical currents includes means to control electrical currents in from none to at least one, second stator winding;

the third means to control electrical currents includes means to control electrical currents in from none to at least one, third stator winding; and the fourth means to control electrical currents includes means to control electrical currents in from none to at least one, fourth stator winding.

9. A controller according to claims 7 or 8, further comprising:

the first stator magnetic poles per repeatable section being separated by separations designated within each repeatable section as first-stator, first separation and first-stator, second separation, and said separations being placed alternately first and second in the direction of relative movement between the first stator and the first armature;

the second stator magnetic poles per repeatable section being separated by separations designated within each repeatable section as second-stator, first separation and second-stator, second separation, and said separations being placed alternately first and second in the direction of relative movement between the second stator and the second armature;

the third stator magnetic poles per repeatable section being separated by separations designated within each repeatable section as third-stator, first separation and third-stator, second separation, and said separations being placed alternately first and second in the direction of relative movement between the third stator and the third armature;

the fourth stator magnetic poles per repeatable section being separated by separations designated within each repeatable section as fourth-stator, first separation and fourth-stator, second separation, and said separations being placed alternately first and second in the direction of relative movement between the fourth stator and the fourth armature;

a first means to orient the first armature electromagnetic poles with respect to the first stator magnetic poles by as much as one first stator magnetic pole pitch to control the direction and magnitude of the force and torque generated by the first motor as follows:

the direction of the force and torque generated by the first motor being forward when a north-polarity, first armature electromagnetic pole adjacent to the first-stator, first separation moves to approach a south-polarity, first stator magnetic pole;

the direction of the force and torque generated by the first motor being reverse when a north-polarity, first armature electromagnetic pole adjacent to the first-stator, second separation moves to approach a south-polarity, first stator magnetic pole; and the magnitude of the force and torque generated by the first motor being controlled between a maximum obtained when the first armature electromagnetic poles are equidistant between the first stator magnetic poles and a minimum obtained when the first armature electromagnetic poles are closest to the first stator magnetic poles;

a second means to orient the second armature electromagnetic poles with respect to the second stator magnetic poles by as much as one second stator magnetic pole pitch to control the direction and magnitude of the force and torque generated by the second motor as follows:

the direction of the force and torque generated by the second motor being forward when a north-polarity, second armature electromagnetic pole adjacent to the second-stator, first separation moves to approach a south-polarity, second stator magnetic pole;

the direction of the force and torque generated by the second motor being reverse when a north-polarity, second armature electromagnetic pole adjacent to the second-stator, second separation moves to approach a south-polarity, second stator magnetic pole; and the magnitude of the force and torque generated by the second motor being controlled between a maximum obtained when the second armature electromagnetic poles are equidistant between the second stator magnetic poles and a minimum obtained when the second armature electromagnetic poles are closest to the second stator magnetic poles;

a third means to orient the third armature electromagnetic poles with respect to the third stator magnetic poles by as much as one third stator magnetic pole pitch to control the direction and magnitude of the force and torque generated by the third motor as follows:

the direction being forward when a north-polarity, third armature electromagnetic pole adjacent to the third-stator, first separation moves to approach a south-polarity, third stator magnetic pole;

the direction being reverse when a north-polarity, third armature electromagnetic pole adjacent to the third-stator, second separation moves to approach a south-polarity, third stator magnetic pole; and the magnitude of the force and torque generated by the third motor being controlled between a maximum obtained when the third armature electromagnetic poles are equidistant between the third stator magnetic poles and a minimum obtained when the third armature electromagnetic poles are closest to the third stator magnetic poles;

a fourth means to orient the fourth armature electromagnetic poles with respect to the fourth stator magnetic poles by as much as one fourth stator magnetic pole pitch to control the direction and magnitude of the force and torque generated by the fourth motor as follows:

the direction being forward when a north-polarity, fourth armature electromagnetic pole adjacent to the fourth-stator, first separation moves to approach a south-polarity, fourth stator magnetic pole;

the direction being reverse when a north-polarity, fourth armature electromagnetic pole adjacent to the fourth-stator, second separation moves to approach a south-polarity, fourth stator magnetic pole; and the magnitude of the force and torque generated by the fourth motor being controlled between a maximum obtained when the fourth armature electromagnetic poles are equidistant between the fourth stator magnetic poles and a minimum obtained when the fourth armature electromagnetic poles are closest to the fourth stator magnetic poles; and the means to cooperatively control includes means to control the first means to orient and the second means to orient and the third means to orient and the fourth means to orient, to control the magnitude and direction of the force and torque generated by the first motor and the magnitude and direction of the force and torque generated by the second motor and the magnitude and direction of the force and torque generated by the third motor and the magnitude and direction of the force and torque generated by the fourth motor, at the armature-common mechanical member with respect to the stator-common mechanical member.

10. A controller according to claim 7 wherein the multiple electric motors means includes a fifth motor;

the fifth motor including a fifth stator and a fifth armature and the fifth stator including stator magnetic poles and the fifth armature including multiple, fifth, two-node, open-circuit armature windings inductively linking the fifth armature and insulated from the fifth armature and from each other;

the fifth stator mechanically coupled to the stator-common mechanical member;

the fifth armature mechanically coupled to the armature-common mechanical member;

the fifth motor having at least one, fifth-motor, repeatable section, wherein a repeatable section includes a group of poles and windings;

the fifth stator having two, fifth stator magnetic poles per fifth-motor, repeatable section;

a fifth magnetomotive force means energizing the fifth stator magnetic poles as a north pole and a south pole per fifth-motor, repeatable section, and with adjacent poles being of opposite polarity;

a fifth means to control electrical currents in from none to at least one, fifth, two-node, open-circuit armature winding thereby forming fifth armature electromagnetic poles of various numbers to fifth motor strength levels available, with adjacent fifth armature electromagnetic poles having opposite polarity, and with no more than two, fifth armature electromagnetic poles per fifth-motor, repeatable section; and the means to cooperatively control includes means to cooperatively control:

the first means to control electrical currents;
the second means to control electrical currents;
the third means to control electrical currents;
the fourth means to control electrical currents; and
the fifth means to control electrical currents; to control the force and torque generated by the first motor and the second motor and the third motor and the fourth motor and the fifth motor at the armature-common mechanical member with respect to the stator-common mechanical member.

11. A controller as in claim 10 further comprising:

the first magnetomotive force means comprises at least one, first stator winding inductively linking at least one, first stator magnetic pole per first-motor, repeatable section;

the second magnetomotive force means comprises at least one, second stator winding inductively linking at least one, second stator magnetic pole per second-motor, repeatable section;

the third magnetomotive force means comprises at least one, third stator winding inductively linking at least one, third stator magnetic pole per third-motor, repeatable section;

the fourth magnetomotive force means comprises at least one, fourth stator winding inductively linking at least one, fourth stator magnetic pole per fourth-motor, repeatable section;

the fifth magnetomotive force means comprises at least one, fifth stator winding inductively linking at least one, fifth stator magnetic pole per fifth-motor, repeatable section;

the first means to control electrical currents includes means to control electrical currents in from none to at least one, first stator winding;

the second means to control electrical currents includes means to control electrical currents in from none to at least one, second stator winding;

the third means to control electrical currents includes means to control electrical currents in from none to at least one, third stator winding;

the fourth means to control electrical currents includes means to control electrical currents in from none to at least one, fourth stator winding; and the fifth means to control electrical currents includes means to control electrical currents in from none to at least one, fifth stator winding.

12. A controller according to claims 10 or 11, further comprising:

the first stator magnetic poles per repeatable section being separated by separations designated within each repeatable section as first-stator, first separation and first-stator, second separation, and said separations being placed alternately first and second in the direction of relative movement between the first stator and the first armature;

the second stator magnetic poles per repeatable section being separated by separations designated within each repeatable section as second-stator, first separation and second-stator, second separation, and said separations being placed alternately first and second in the direction of relative movement between the second stator and the second armature;

the third stator magnetic poles per repeatable section being separated by separations designated within each repeatable section as third-stator, first separation and third-stator, second separation, and said separations being placed alternately first and second in the direction of relative movement between the third stator and the third armature;

the fourth stator magnetic poles per repeatable section being separated by separations designated within each repeatable section as fourth-stator, first separation and fourth-stator, second separation, and said separations being placed alternately first and second in the direction of relative movement between the fourth stator and the fourth armature;

the fifth stator magnetic poles per repeatable section being separated by separations designated within each repeatable section as fifth-stator, first separation and fifth-stator, second separation, and said separations being placed alternately first and second in the direction of relative movement between the fifth stator and the fifth armature;

a first means to orient the first armature electromagnetic poles with respect to the first stator magnetic poles by as much as one first stator magnetic pole pitch to control the direction and magnitude of the force and torque generated by the first motor as follows:

the direction of the force and torque generated by the first motor being forward when a north-polarity, first armature electromagnetic pole adjacent to the first-stator, first separation moves to approach a south-polarity, first stator magnetic pole;

the direction of the force and torque generated by the first motor being reverse when a north-polarity, first armature electromagnetic pole adjacent to the first-stator, second separation moves to approach a south-polarity, first stator magnetic pole; and the magnitude of the force and torque generated by the first motor being controlled between a maximum obtained when the first armature electromagnetic poles are equidistant between the first stator magnetic poles and a minimum obtained when the first armature electromagnetic poles are closest to the first stator magnetic poles;

a second means to orient the second armature electromagnetic poles with respect to the second stator magnetic poles by as much as one second stator magnetic pole pitch to control the direction and magnitude of the force and torque generated by the second motor as follows:

the direction of the force and torque generated by the second motor being forward when a north-polarity, second armature electromagnetic pole adjacent to the second-stator, first separation moves to approach a south-polarity, second stator magnetic pole;

the direction of the force and torque generated by the second motor being reverse when a north-polarity, second armature electromagnetic pole adjacent to the second-stator, second separation moves to approach a south-polarity, second stator magnetic pole; and the magnitude of the force and torque generated by the second motor being controlled between a maximum obtained when the second armature electromagnetic poles are equidistant between the second stator magnetic poles and a minimum obtained when the second armature electromagnetic poles are closest to the second stator magnetic poles;

a third means to orient the third armature electromagnetic poles with respect to the third stator magnetic poles by as much as one third stator magnetic pole pitch to control the direction and magnitude of the force and torque generated by the third motor as follows:

the direction being forward when a north-polarity, third armature electromagnetic pole adjacent to the third-stator, first separation moves to approach a south-polarity, third stator magnetic pole;

the direction being reverse when a north-polarity, third armature electromagnetic pole adjacent to the third-stator, second separation moves to approach a south-polarity, third stator magnetic pole; and the magnitude of the force and torque generated by the third motor being controlled between a maximum obtained when the third armature electromagnetic poles are equidistant between the third stator magnetic poles and a minimum obtained when the third armature electromagnetic poles are closest to the third stator magnetic poles;

a fourth means to orient the fourth armature electromagnetic poles with respect to the fourth stator magnetic poles by as much as one fourth stator magnetic pole pitch to control the direction and magnitude of the force and torque generated by the fourth motor as follows:

the direction being forward when a north-polarity, fourth armature electromagnetic pole adjacent to the fourth-stator, first separation moves to approach a south-polarity, fourth stator magnetic pole;

the direction being reverse when a north-polarity, fourth armature electromagnetic pole adjacent to the fourth-stator, second separation moves to approach a south-polarity, fourth stator magnetic pole; and the magnitude of the force and torque generated by the fourth motor being controlled between a maximum obtained when the fourth armature electromagnetic poles are equidistant between the fourth stator magnetic poles and a minimum obtained when the fourth armature electromagnetic poles are closest to the fourth stator magnetic poles; and a fifth means to orient the fifth armature electromagnetic poles with respect to the fifth stator magnetic poles by as much as one fifth stator magnetic pole pitch to control the direction and magnitude of the force and torque generated by the fifth motor as follows:

the direction being forward when a north-polarity, fifth armature electromagnetic pole adjacent to the fifth-stator, first separation moves to approach a south-polarity, fifth stator magnetic pole;

the direction being reverse when a north-polarity, fifth armature electromagnetic pole adjacent to the fifth-stator, second separation moves to approach a south-polarity, fifth stator magnetic pole; and the magnitude of the force and torque generated by the fifth motor being controlled between a maximum obtained when the fifth armature electromagnetic poles are equidistant between the fifth stator magnetic poles and a minimum obtained when the fifth armature electromagnetic poles are closest to the fifth stator magnetic poles; and the means to cooperatively control includes means to control the first means to orient to control the magnitude and direction of the force and torque generated by the first motor and the second means to orient to control the magnitude and direction of the force and torque generated by the second motor and the third means to orient to control the magnitude and direction of the force and torque generated by the third motor and the fourth means to orient to control the magnitude and direction of the force and torque generated by the fourth motor and the means to control the fifth means to orient to control the magnitude and direction of the force and torque generated by the fifth motor, at the armature-common mechanical member with respect to the stator-common mechanical member.

13. A controller according to claim 10 wherein the multiple electric motors means includes a sixth motor;

the sixth motor including a sixth stator and a sixth armature and the sixth stator including stator magnetic poles and the sixth armature including multiple, sixth, two-node, open-circuit armature windings inductively linking the sixth armature and insulated from the sixth armature and from each other;

the sixth stator mechanically coupled to the stator-common mechanical member;

the sixth armature mechanically coupled to the armature-common mechanical member;

the sixth motor having at least one, sixth-motor, repeatable section, wherein a repeatable section includes a group of poles and windings;

the sixth stator having two, sixth stator magnetic poles per sixth-motor, repeatable section;

a sixth magnetomotive force means energizing the sixth stator magnetic poles as a north pole and a south pole per sixth-motor, repeatable section, and with adjacent poles being of opposite polarity;

a sixth means to control electrical currents in from none to at least one, sixth, two-node, open-circuit armature winding thereby forming sixth armature electromagnetic poles of various numbers to sixth motor strength levels available, with adjacent sixth armature electromagnetic poles having opposite polarity, and with no more than two, sixth armature electromagnetic poles per sixth-motor, repeatable section; and the means to cooperatively control includes means to cooperatively control:
the first means to control electrical currents;
the second means to control electrical currents;
the third means to control electrical currents;
the fourth means to control electrical currents;
the fifth means to control electrical currents; and
the sixth means to control electrical currents; to control the force and torque generated by the first motor and the second motor and the third motor and the fourth motor and the fifth motor and the sixth motor at the armature-common mechanical member with respect to the stator-common mechanical member.

14. A controller as in claim 13 further comprising:

the first magnetomotive force means comprises at least one, first stator winding inductively linking at least one, first stator magnetic pole per first-motor, repeatable section;

the second magnetomotive force means comprises at least one, second stator winding inductively linking at least one, second stator magnetic pole per second-motor, repeatable section;

the third magnetomotive force means comprises at least one, third stator winding inductively linking at least one, third stator magnetic pole per third-motor, repeatable section;

the fourth magnetomotive force means comprises at least one, fourth stator winding inductively linking at least one, fourth stator magnetic pole per fourth-motor, repeatable section;

the fifth magnetomotive force means comprises at least one, fifth stator winding inductively linking at least one, fifth stator magnetic pole per fifth-motor, repeatable section;

the sixth magnetomotive force means comprises at least one, sixth stator winding inductively linking at least one, sixth stator magnetic pole per sixth-motor, repeatable section;

the first means to control electrical currents includes means to control electrical currents in from none to at least one, first stator winding;

the second means to control electrical currents includes means to control electrical currents in from none to at least one, second stator winding;

the third means to control electrical currents includes means to control electrical currents in from none to at least one, third stator winding;

the fourth means to control electrical currents includes means to control electrical currents in from none to at least one, fourth stator winding;

the fifth means to control electrical currents includes means to control electrical currents in from none to at least one, fifth stator winding; and the sixth means to control electrical currents includes means to control electrical currents in from none to at least one, sixth stator winding.

15. A controller according to claims 13 or 14, further comprising:

the first stator magnetic poles per repeatable section being separated by separations designated within each repeatable section as first-stator, first separation and first-stator, second separation, and said separations being placed alternately first and second in the direction of relative movement between the first stator and the first armature;

the second stator magnetic poles per repeatable section being separated by separations designated within each repeatable section as second-stator, first separation and second-stator, second separation, and said separations being placed alternately first and second in the direction of relative movement between the second stator and the second armature;

the third stator magnetic poles per repeatable section being separated by separations designated within each repeatable section as third-stator, first separation and third-stator, second separation, and said separations being placed alternately first and second in the direction of relative movement between the third stator and the third armature;

the fourth stator magnetic poles per repeatable section being separated by separations designated within each repeatable section as fourth-stator, first separation and fourth-stator, second separation, and said separations being placed alternately first and second in the direction of relative movement between the fourth stator and the fourth armature;

the fifth stator magnetic poles per repeatable section being separated by separations designated within each repeatable section as fifth-stator, first separation and fifth-stator, second separation, and said separations being placed alternately first and second in the direction of relative movement between the fifth stator and the fifth armature;

the sixth stator magnetic poles per repeatable section being separated by separations designated within each repeatable section as sixth-stator, first separation and sixth-stator, second separation, and said separations being placed alternately first and second in the direction of relative movement between the sixth stator and the sixth armature;

a first means to orient the first armature electromagnetic poles with respect to the first stator magnetic poles by as much as one first stator magnetic pole pitch to control the direction and magnitude of the force and torque generated by the first motor as follows:

the direction of the force and torque generated by the first motor being forward when a north-polarity, first armature electromagnetic pole adjacent to the first-stator, first separation moves to approach a south-polarity, first stator magnetic pole;

the direction of the force and torque generated by the first motor being reverse when a north-polarity, first armature electromagnetic pole adjacent to the first-stator, second separation moves to approach a south-polarity, first stator magnetic pole; and the magnitude of the force and torque generated by the first motor being controlled between a maximum obtained when the first armature electromagnetic poles are equidistant between the first stator magnetic poles and a minimum obtained when the first armature electromagnetic poles are closest to the first stator magnetic poles;

a second means to orient the second armature electromagnetic poles with respect to the second stator magnetic poles by as much as one second stator magnetic pole pitch to control the direction and magnitude of the force and torque generated by the second motor as follows:

the direction of the force and torque generated by the second motor being forward when a north-polarity, second armature electromagnetic pole adjacent to the second-stator, first separation moves to approach a south-polarity, second stator magnetic pole;

the direction of the force and torque generated by the second motor being reverse when a north-polarity, second armature electromagnetic pole adjacent to the second-stator, second separation moves to approach a south-polarity, second stator magnetic pole; and the magnitude of the force and torque generated by the second motor being controlled between a maximum obtained when the second armature electromagnetic poles are equidistant between the second stator magnetic poles and a minimum obtained when the second armature electromagnetic poles are closest to the second stator magnetic poles;

a third means to orient the third armature electromagnetic poles with respect to the third stator magnetic poles by as much as one third stator magnetic pole pitch to control the direction and magnitude of the force and torque generated by the third motor as follows:

the direction being forward when a north-polarity, third armature electromagnetic pole adjacent to the third-stator, first separation moves to approach a south-polarity, third stator magnetic pole;

the direction being reverse when a north-polarity, third armature electromagnetic pole adjacent to the third-stator, second separation moves to approach a south-polarity, third stator magnetic pole; and the magnitude of the force and torque generated by the third motor being controlled between a maximum obtained when the third armature electromagnetic poles are equidistant between the third stator magnetic poles and a minimum obtained when the third armature electromagnetic poles are closest to the third stator magnetic poles;

a fourth means to orient the fourth armature electromagnetic poles with respect to the fourth stator magnetic poles by as much as one fourth stator magnetic pole pitch to control the direction and magnitude of the force and torque generated by the fourth motor as follows:

the direction being forward when a north-polarity, fourth armature electromagnetic pole adjacent to the fourth-stator, first separation moves to approach a south-polarity, fourth stator magnetic pole;

the direction being reverse when a north-polarity, fourth armature electromagnetic pole adjacent to the fourth-stator, second separation moves to approach a south-polarity, fourth stator magnetic pole; and the magnitude of the force and torque generated by the fourth motor being controlled between a maximum obtained when the fourth armature electromagnetic poles are equidistant between the fourth stator magnetic poles and a minimum obtained when the fourth armature electromagnetic poles are closest to the fourth stator magnetic poles; and a fifth means to orient the fifth armature electromagnetic poles with respect to the fifth stator magnetic poles by as much as one fifth stator magnetic pole pitch to control the direction and magnitude of the force and torque generated by the fifth motor as follows:

the direction being forward when a north-polarity, fifth armature electromagnetic pole adjacent to the fifth-stator, first separation moves to approach a south-polarity, fifth stator magnetic pole;

the direction being reverse when a north-polarity, fifth armature electromagnetic pole adjacent to the fifth-stator, second separation moves to approach a south-polarity, fifth stator magnetic pole; and the magnitude of the force and torque generated by the fifth motor being controlled between a maximum obtained when the fifth armature electromagnetic poles are equidistant between the fifth stator magnetic poles and a minimum obtained when the fifth armature electromagnetic poles are closest to the fifth stator magnetic poles;

a sixth means to orient the sixth armature electromagnetic poles with respect to the sixth stator magnetic poles by as much as one sixth stator magnetic pole pitch to control the direction and magnitude of the force and torque generated by the sixth motor as follows:

the direction being forward when a north-polarity, sixth armature electromagnetic pole adjacent to the sixth-stator, first separation moves to approach a south-polarity, sixth stator magnetic pole;

the direction being reverse when a north-polarity, sixth armature electromagnetic pole adjacent to the sixth-stator, second separation moves to approach a south-polarity, sixth stator magnetic pole; and the magnitude of the force and torque generated by the sixth motor being controlled between a maximum obtained when the sixth armature electromagnetic poles are equidistant between the sixth stator magnetic poles and a minimum obtained when the sixth armature electromagnetic poles are closest to the sixth stator magnetic poles; and the means to cooperatively control includes means to control the first means to orient to control the magnitude and direction of the force and torque generated by the first motor and the second means to orient to control the magnitude and direction of the force and torque generated by the second motor and the third means to orient to control the magnitude and direction of the force and torque generated by the third motor and the fourth means to orient to control the magnitude and direction of the force and torque generated by the fourth motor and the fifth means to orient to control the magnitude and direction of the force and torque generated by the fifth motor and the sixth means to orient to control the magnitude and direction of the force and torque generated by the sixth motor, at the armature-common mechanical member with respect to the stator-common mechanical member.

16. A controller according to claim 13 wherein the multiple electric motors means includes a seventh motor;

the seventh motor including a seventh stator and a seventh armature and the seventh stator including stator magnetic poles and the seventh armature including multiple, seventh, two-node, open-circuit armature windings inductively linking the seventh armature and insulated from the seventh armature and from each other;

the seventh stator mechanically coupled to the stator-common mechanical member;

the seventh armature mechanically coupled to the armature-common mechanical member;

the seventh motor having at least one, seventh-motor, repeatable section, wherein a repeatable section includes a group of poles and windings;

the seventh stator having two, seventh stator magnetic poles per seventh-motor, repeatable section;

a seventh magnetomotive force means energizing the seventh stator magnetic poles as a north pole and a south pole per seventh-motor, repeatable section, and with adjacent poles being of opposite polarity;

a seventh means to control electrical currents in from none to at least one, seventh, two-node, open-circuit armature winding thereby forming seventh armature electromagnetic poles of various numbers to seventh motor strength levels available, with adjacent seventh armature electromagnetic poles having opposite polarity, and with no more than two, seventh armature electromagnetic poles per seventh-motor, repeatable section; and the means to cooperatively control includes means to cooperatively control:
the first means to control electrical currents;
the second means to control electrical currents;
the third means to control electrical currents;
the fourth means to control electrical currents;
the fifth means to control electrical currents;
the sixth means to control electrical currents; and
the seventh means to control electrical currents; to control the force and torque generated by the first motor and the second motor and the third motor and the fourth motor and the fifth motor and the sixth motor and the seventh motor at the armature-common mechanical member with respect to the stator-common mechanical member.

17. A controller as in claim 16 further comprising:
the first magnetomotive force means comprises at least one, first stator winding inductively linking at least one, first stator magnetic pole per first-motor, repeatable section;

the second magnetomotive force means comprises at least one, second stator winding inductively linking at least one, second stator magnetic pole per second-motor, repeatable section;

the third magnetomotive force means comprises at least one, third stator winding inductively linking at least one, third stator magnetic pole per third-motor, repeatable section;

the fourth magnetomotive force means comprises at least one, fourth stator winding inductively linking at least one, fourth stator magnetic pole per fourth-motor, repeatable section;

the fifth magnetomotive force means comprises at least one, fifth stator winding inductively linking at least one, fifth stator magnetic pole per fifth-motor, repeatable section;

the sixth magnetomotive force means comprises at least one, sixth stator winding inductively linking at least one, sixth stator magnetic pole per sixth-motor, repeatable section;

the seventh magnetomotive force means comprises at least one, seventh stator winding inductively linking at least one, seventh stator magnetic pole per seventh-motor, repeatable section;

the first means to control electrical currents includes means to control electrical currents in from none to at least one, first stator winding;

the second means to control electrical currents includes means to control electrical currents in from none to at least one, second stator winding;

the third means to control electrical currents includes means to control electrical currents in from none to at least one, third stator winding;

the fourth means to control electrical currents includes means to control electrical currents in from none to at least one, fourth stator winding;

the fifth means to control electrical currents includes means to control electrical currents in from none to at least one, fifth stator winding;

the sixth means to control electrical currents includes means to control electrical currents in from none to at least one, sixth stator winding; and the seventh means to control electrical currents includes means to control electrical currents in from none to at least one, seventh stator winding.

18. A controller according to claims 16 or 17, further comprising:
the first stator magnetic poles per repeatable section being separated by separations designated within each repeatable section as first-stator, first separation and first-stator, second separation, and said separations being placed alternately first and second in the direction of relative movement between the first stator and the first armature;

the second stator magnetic poles per repeatable section being separated by separations designated within each repeatable section as second-stator, first separation and second-stator, second separation, and said separations being placed alternately first and second in the direction of relative movement between the second stator and the second armature;

the third stator magnetic poles per repeatable section being separated by separations designated within each repeatable section as third-stator, first separation and third-stator, second separation, and said separations being placed alternately first and second in the direction of relative movement between the third stator and the third armature;

the fourth stator magnetic poles per repeatable section being separated by separations designated within each repeatable section as fourth-stator, first separation and fourth-stator, second separation, and said separations being placed alternately first and second in the direction of relative movement between the fourth stator and the fourth armature;

the fifth stator magnetic poles per repeatable section being separated by separations designated within each repeatable section as fifth-stator, first separation and fifth-stator, second separation, and said separations being placed alternately first and second in the direction of relative movement between the fifth stator and the fifth armature;

the sixth stator magnetic poles per repeatable section being separated by separations designated within each repeatable section as sixth-stator, first separation and sixth-stator, second separation, and said separations being placed alternately first and second in the direction of relative movement between the sixth stator and the sixth armature;

the seventh stator magnetic poles per repeatable section being separated by separations designated within each repeatable section as seventh-stator, first separation and seventh-stator, second separation, and said separations being placed alternately first and second in the direction of relative movement between the seventh stator and the seventh armature;

a first means to orient the first armature electromagnetic poles with respect to the first stator magnetic poles by as much as one first stator magnetic pole pitch to control the direction and magnitude of the force and torque generated by the first motor as follows:

the direction of the force and torque generated by the first motor being forward when a north-polarity, first armature electromagnetic pole adjacent to the first-stator, first separation moves to approach a south-polarity, first stator magnetic pole;

the direction of the force and torque generated by the first motor being reverse when a north-polarity, first armature electromagnetic pole adjacent to the first-stator, second separation moves to approach a south-polarity, first stator magnetic pole; and the magnitude of the force and torque generated by the first motor being controlled between a maximum obtained when the first armature electromagnetic poles are equidistant between the first stator magnetic poles and a minimum obtained when the first armature electromagnetic poles are closest to the first stator magnetic poles;

a second means to orient the second armature electromagnetic poles with respect to the second stator magnetic poles by as much as one second stator magnetic pole pitch to control the direction and magnitude of the force and torque generated by the second motor as follows:

the direction of the force and torque generated by the second motor being forward when a north-polarity, second armature electromagnetic pole adjacent to the second-stator, first separation moves to approach a south-polarity, second stator magnetic pole;

the direction of the force and torque generated by the second motor being reverse when a north-polarity, second armature electromagnetic pole adjacent to the second-stator, second separation moves to approach a south-polarity, second stator magnetic pole; and the magnitude of the force and torque generated by the second motor being controlled between a maximum obtained when the second armature electromagnetic poles are equidistant between the second stator magnetic poles and a minimum obtained when the second armature electromagnetic poles are closest to the second stator magnetic poles;

a third means to orient the third armature electromagnetic poles with respect to the third stator magnetic poles by as much as one third stator magnetic pole pitch to control the direction and magnitude of the force and torque generated by the third motor as follows:

the direction being forward when a north-polarity, third armature electromagnetic pole adjacent to the third-stator, first separation moves to approach a south-polarity, third stator magnetic pole;

the direction being reverse when a north-polarity, third armature electromagnetic pole adjacent to the third-stator, second separation moves to approach a south-polarity, third stator magnetic pole; and the magnitude of the force and torque generated by the third motor being controlled between a maximum obtained when the third armature electromagnetic poles are equidistant between the third stator magnetic poles and a minimum obtained when the third armature electromagnetic poles are closest to the third stator magnetic poles;

a fourth means to orient the fourth armature electromagnetic poles with respect to the fourth stator magnetic poles by as much as one fourth stator magnetic pole pitch to control the direction and magnitude of the force and torque generated by the fourth motor as follows:

the direction being forward when a north-polarity, fourth armature electromagnetic pole adjacent to the fourth-stator, first separation moves to approach a south-polarity, fourth stator magnetic pole;

the direction being reverse when a north-polarity, fourth armature electromagnetic pole adjacent to the fourth-stator, second separation moves to approach a south-polarity, fourth stator magnetic pole; and the magnitude of the force and torque generated by the fourth motor being controlled between a maximum obtained when the fourth armature electromagnetic poles are equidistant between the fourth stator magnetic poles and a minimum obtained when the fourth armature electromagnetic poles are closest to the fourth stator magnetic poles; and a fifth means to orient the fifth armature electromagnetic poles with respect to the fifth stator magnetic poles by as much as one fifth stator magnetic pole pitch to control the direction and magnitude of the force and torque generated by the fifth motor as follows:

the direction being forward when a north-polarity, fifth armature electromagnetic pole adjacent to the fifth-stator, first separation moves to approach a south-polarity, fifth stator magnetic pole;

the direction being reverse when a north-polarity, fifth armature electromagnetic pole adjacent to the fifth-stator, second separation moves to approach a south-polarity, fifth stator magnetic pole; and the magnitude of the force and torque generated by the fifth motor being controlled between a maximum obtained when the fifth armature electromagnetic poles are equidistant between the fifth stator magnetic poles and a minimum obtained when the fifth armature electromagnetic poles are closest to the fifth stator magnetic poles;

a sixth means to orient the sixth armature electromagnetic poles with respect to the sixth stator magnetic poles by as much as one sixth stator magnetic pole pitch to control the direction and magnitude of the force and torque generated by the sixth motor as follows:

the direction being forward when a north-polarity, sixth armature electromagnetic pole adjacent to the sixth-stator, first separation moves to approach a south-polarity, sixth stator magnetic pole;

the direction being reverse when a north-polarity, sixth armature electromagnetic pole adjacent to the sixth-stator, second separation moves to approach a south-polarity, sixth stator magnetic pole; and the magnitude of the force and torque generated by the sixth motor being controlled between a maximum obtained when the sixth armature electromagnetic poles are equidistant between the sixth stator magnetic poles and a minimum obtained when the sixth armature electromagnetic poles are closest to the sixth stator magnetic poles;

a seventh means to orient the seventh armature electromagnetic poles with respect to the seventh stator magnetic poles by as much as one seventh stator magnetic pole pitch to control the direction and magnitude of the force and torque generated by the seventh motor as follows:

the direction being forward when a north-polarity, seventh armature electromagnetic pole adjacent to the seventh-stator, first separation moves to approach a south-polarity, seventh stator magnetic pole;

the direction being reverse when a north-polarity, seventh armature electromagnetic pole adjacent to the seventh-stator, second separation moves to approach a south-polarity, seventh stator magnetic pole; and the magnitude of the force and torque generated by the seventh motor being controlled between a maximum obtained when the seventh armature electromagnetic poles are equidistant between the seventh stator magnetic poles and a minimum obtained when the seventh armature electromagnetic poles are closest to the seventh stator magnetic poles; and the means to cooperatively control includes means to control the first means to orient to control the magnitude and direction of the force and torque generated by the first motor and the second means to orient to control the magnitude and direction of the force and torque generated by the second motor and the third means to orient to control the magnitude and direction of the force and torque generated by the third motor and the fourth means to orient to control the magnitude and direction of the force and torque generated by the fourth motor and the fifth means to orient to control the magnitude and direction of the force and torque generated by the fifth motor and the sixth means to orient to control the magnitude and direction of the force and torque generated by the sixth motor and the seventh means to orient to control the magnitude and direction of the force and torque generated by the seventh motor, at the armature-common mechanical member with respect to the stator-common mechanical member.

19. A controller for multiple electric motors mechanically coupled to the same output member comprising:

multiple electric motors wherein respective electric motors include respective stators and respective armatures;

respective stators including respective stator magnetic poles;

respective armatures including multiple, respective, two-node, open-circuit armature windings inductively linking the respective armature and insulated from the respective armature and from each other;

respective motors having at least one, respective repeatable section, wherein a respective repeatable section includes groups of poles and windings;

respective stators having two respective stator magnetic poles per respective repeatable section;

an armature-common mechanical member mechanically coupled to respective armatures;

a stator-common mechanical member mechanically coupled to respective stators;

respective magnetomotive force means energizing respective stator magnetic poles as a north pole and a south pole per respective repeatable section, and with adjacent respective stator magnetic poles being of opposite polarity;

respective means to control respective electrical currents in from none to at least one, respective, two-node, open-circuit armature winding thereby forming respective armature electromagnetic poles of various respective numbers to respective motor strength levels available, with adjacent respective armature electromagnetic poles having opposite polarity, and with no more than two armature electromagnetic poles per respective repeatable section; and means to cooperatively control the respective means to control respective electrical currents to control the force and torque generated by the multiple electric motors at the armature-common mechanical member with respect to the stator-common mechanical member.

* * * * *